(12) United States Patent
Akimoto et al.

(10) Patent No.: US 6,543,903 B2
(45) Date of Patent: Apr. 8, 2003

(54) REFLECTING MIRROR AND REAR PROJECTION DISPLAY MAKING USE THEREOF

(75) Inventors: Toshio Akimoto; Hiroshi Nishikawa, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/734,081

(22) Filed: Dec. 11, 2000

(65) Prior Publication Data

US 2001/0004283 A1 Jun. 21, 2001

(30) Foreign Application Priority Data

Dec. 17, 1999 (JP) .............................. 11-358282
Sep. 18, 2000 (JP) ......................... 2000-281788

(51) Int. Cl.[7] .............................................. G02B 7/182
(52) U.S. Cl. ..................... 359/883; 359/884; 359/584
(58) Field of Search ................... 359/883, 884, 359/599, 584, 586, 590; 379/53; 353/77, 78

(56) References Cited

U.S. PATENT DOCUMENTS

| | | | | |
|---|---|---|---|---|
| 4,072,541 A | * | 2/1978 | Meulenberg, Jr. et al. | 136/89 |
| 4,456,336 A | * | 6/1984 | Chung et al. | 350/338 |
| 4,928,301 A | * | 5/1990 | Amoot | 379/53 |
| 5,447,208 A | * | 9/1995 | Lund et al. | 175/428 |
| 5,549,212 A | * | 8/1996 | Kanoh et al. | 216/24 |
| 5,929,954 A | * | 7/1999 | Negishi et al. | 348/825 |

OTHER PUBLICATIONS

"Surface Roughness–Definitions and Designation," *Japanese Industrial Standard* UIS B 0601 (1994).

* cited by examiner

*Primary Examiner*—Mohammad Sikder
(74) *Attorney, Agent, or Firm*—Merchant & Gould P.C.

(57) ABSTRACT

There is provided a reflecting mirror for use in a rear projection display and so on, comprising a glass substrate at least one surface of which is polished to have a predetermined surface waviness (0.05 $\mu$m or less on the measurement condition that the cut-off value is 0.8 mm to 8 mm), and a reflecting film which is formed on the polished surface of the glass substrate by film-forming in order of aluminum (Al), magnesium fluoride ($MgF_2$) and titanium dioxide ($TiO_2$). As a result, it is possible to obtain a reflecting mirror wherein any pattern of light and shade in an image projected on a screen which occurs due to the difference in light intensity resultant from irregularities in the mirror are prevented, and thereby the image quality can be improved.

4 Claims, 3 Drawing Sheets

REFLECTING MIRROR AND REAR PROJECTION DISPLAY MAKING USE THEREOF

BACKGROUND OF THE INVENTION

1. Field of the Invention

The present invention relates to a reflecting mirror for use in a display device by which an image to be displayed is enlarged and reflected on a mirror and thereby is projected on a screen, such as that of a rear projection television, and the invention relates to a rear projection display making use thereof.

2. Description of Prior Art

Conventionally, in a reflecting mirror for a rear projection display, a reflecting film of aluminum is formed by an evaporation method or a sputtering method. Also, a glass substrate which is produced by a float process is normally used.

However, on a surface of such glass substrate formed by a float process, minute irregularities which are referred to as microcorrugations (around 0.1 $\mu$m-0.16 $\mu$m on the measurement condition that the cut-off value is 0.8 mm to 8 mm) occur parallel to the transfer direction of the float process in the course of the production. Such irregularities inevitably occur on a surface of the glass substrate due to the production process of the glass substrate.

Therefore, in a case of using a reflecting mirror which is obtained by forming a reflecting film on a surface of such glass substrate for a rear projection display, parallel light which is incident on a reflecting mirror 100 is reflected by a reflection surface 101 which has irregularities, so as to be deviated from being parallel, as shown in FIG. 4. As a result, a pattern of light and shade occurs in an image projected on a screen 102 due to the spatial difference in light intensity, thereby presenting a cause of remarkable deterioration in image quality.

SUMMARY OF THE INVENTION

It is therefore an object of the present invention to provide a reflecting mirror, wherein any pattern of light and shade in an image projected on a screen that may be due to the spatial difference in light intensity is not present, thereby enabling an improvement in image quality, and a rear projection display making use thereof.

According to one aspect of the present invention, there is provided a reflecting mirror for use in a rear projection display and so on, comprising a glass substrate at least one surface of which is polished to have a predetermined surface waviness, and a reflecting film which is formed on the polished surface of the glass substrate.

According to another aspect of the present invention, in the reflecting mirror mentioned above, the glass substrate is produced by a float process to have minute irregularities of 0.1 $\mu$m or less on the measurement condition that the cut-off value is 0.8 mm to 8 mm.

According to still another aspect of the present invention, in the reflecting mirror mentioned above, the predetermined surface waviness is 0.05 $\mu$m or less on the measurement condition that the cut-off value is 0.8 mm to 8 mm.

According to still another aspect of the present invention, in the reflecting mirror mentioned above, the reflecting film is obtained by film-forming in the order of aluminum (Al), magnesium fluoride (MgF$_2$) and titanium dioxide (TiO$_2$). Formed by this method, it is possible that the reflecting mirror has a reflectance of 94%, while a reflecting mirror formed only of aluminum has a lesser reflectance of 88–90%.

According to still another aspect of the present invention, there is provided a rear projection display, comprising the reflecting mirror mentioned above, an optical unit, and a screen.

DETAILED DESCRIPTION OF PREFERRED EMBODIMENT(S)

Hereinafter, embodiments according to the present invention will be fully explained with reference to the attached drawings.

In order to produce a reflecting mirror according to the present invention, a glass substrate, which is produced by a float process to have a thickness of 3 mm, is cut to be a predetermined size, and thereafter the end surface thereof is chamfered. It is preferable that minute irregularities on the surface of the glass substrate are equal to or less than 0.1 $\mu$m on the measurement condition that the cut-off value is 0.8 mm to 8 mm, taking a surface waviness required for a subsequent polishing process into consideration.

Next, with a plane polishing apparatus using cerium oxide as a abrasive material, the surface of the glass substrate is removed by around 3 $\mu$m and minute irregularities thereon is reduced, and thereby the surface waviness thereof is made to be of a predetermined value.

It is preferable that the predetermined surface waviness is equal to or less than 0.05 $\mu$m on the measurement condition that the cut-off value is 0.8 mm to 8 mm measured, for example, using the SURFCOM 479A manufactured by Tokyo Seimitsu Co., Ltd. as a surface roughness measurement apparatus, taking an image quality required in a case where the reflecting mirror is applied as a mirror of a rear projection display into consideration.

However, if the predetermined surface waviness is equal to or less than 0.001 $\mu$m on the measurement condition that the cut-off value is 0.8 mm to 8 mm, it takes a longer period of time to carry out the polishing and the cost of producing such a reflecting mirror consequently increases.

Next, the polished glass substrate is immersed in alkaline cleaning agent including potassium hydroxide and is cleaned with an ultrasonic washing machine. Thereafter, an ultrasonic cleaning with pure water is conducted upon the surface of the glass substrate, thereby making the surface clean. However, as a method of cleaning with pure water, a well-known method such as a brush cleaning can be used as well as the ultrasonic cleaning.

Figure 1:
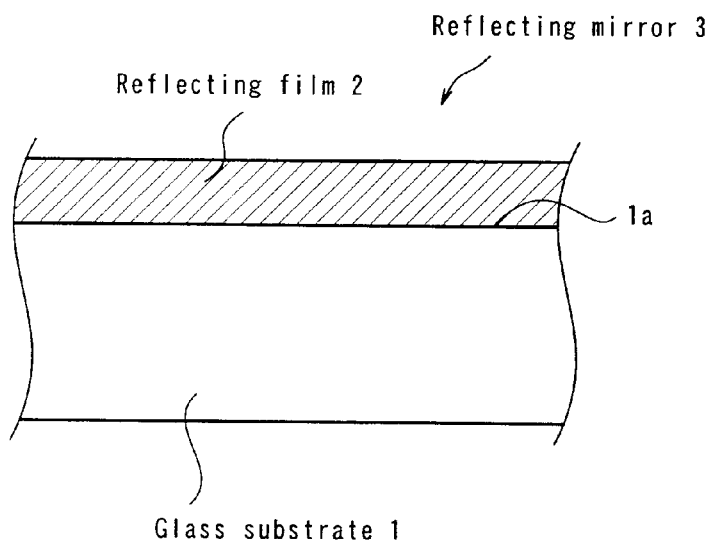
FIG. 1 is a cross-sectional view of a reflecting mirror according to the present invention.

Next, as shown in FIG. 1, a reflecting film 2 is formed by sequential film-forming in the order of aluminum (Al), magnesium fluoride (MgF$_2$) and titanium dioxide (TiO$_2$) by a vacuum evaporation on one surface 1a of the cleaned glass substrate 1, and thereby a reflecting mirror 3 is obtained. The thicknesses of the Al film, the MgF$_2$ film and the TiO$_2$ film are respectively within the range of 50 nm to 300 nm.

An explanation will be given on the function of the reflecting mirror 3 which is constructed as mentioned above. Parallel light incident on the reflecting mirror 3 is reflected at a reflection angle equal to the incident angle.

Therefore, even if a glass substrate formed by a float process is used as the glass substrate 1 for the reflecting mirror 3, the light reflected on the reflecting film 2 is prevented from going in different directions by forming the reflecting film 2 after the one surface 1a of the glass substrate 1 is polished.

Figure 2:
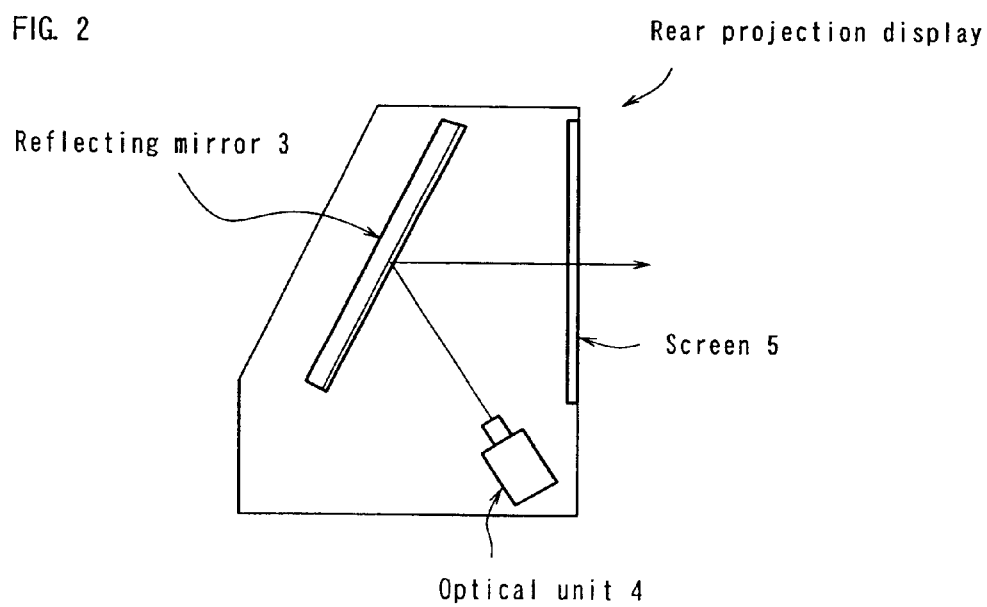
FIG. 2 is a structural view of a rear projection display according to the present invention.
Figure 3:
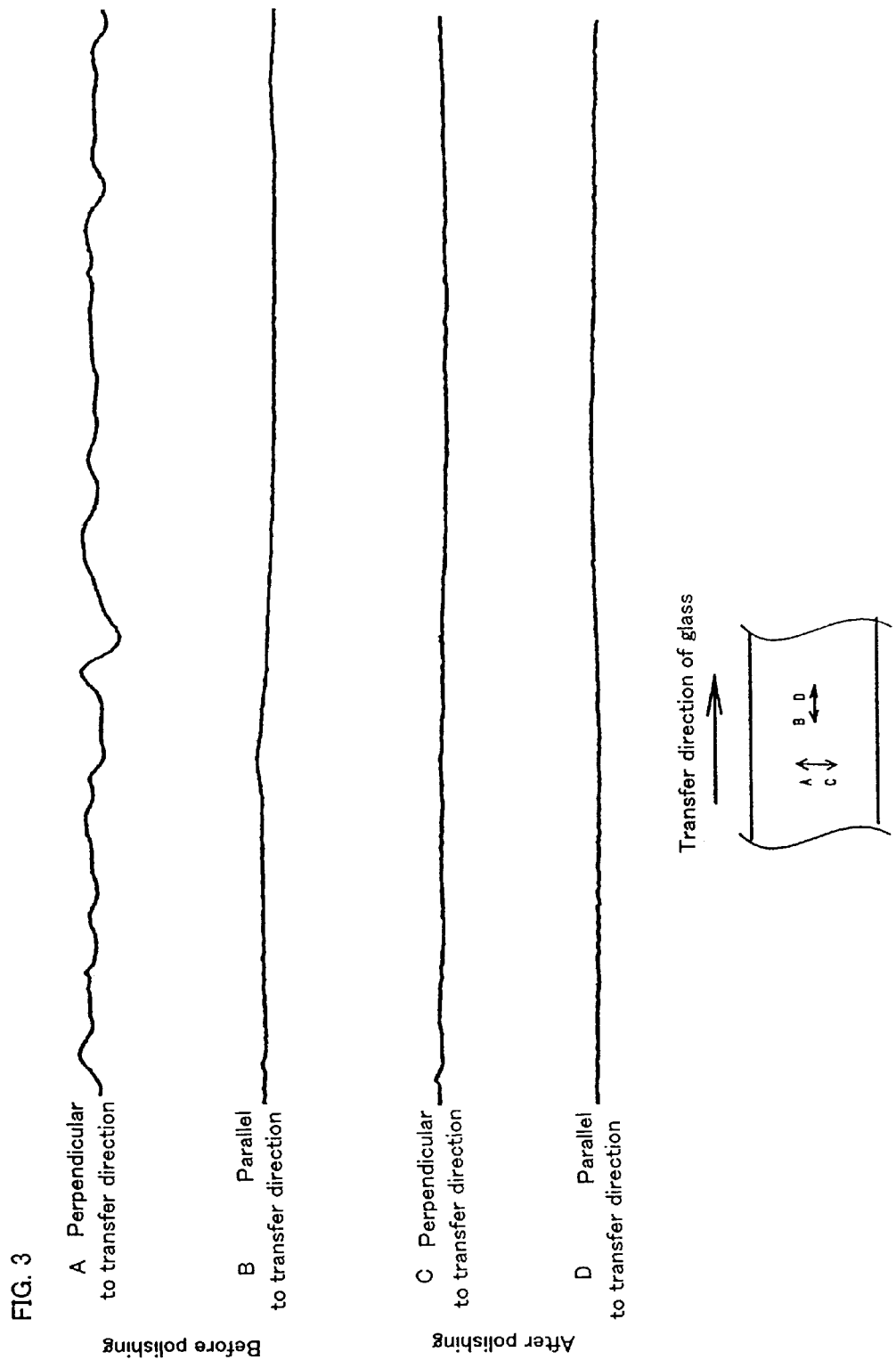
FIGS. 3A, 3B, 3C and 3D are diagrams showing the results of measurement of irregularities on the surface of the glass substrate before and after polishing.
Figure 4:
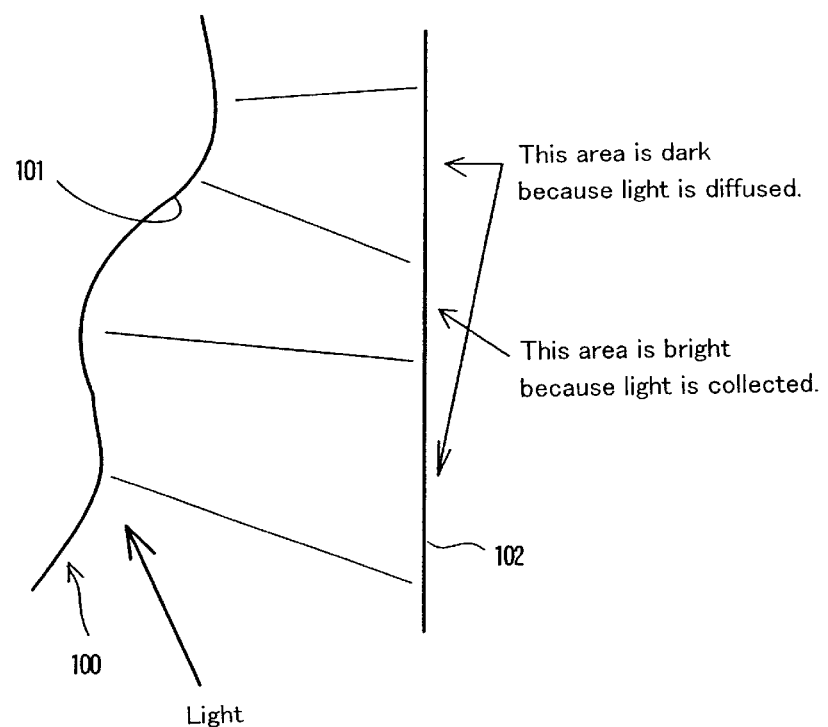
FIG. 4 is a view illustrating a diffusion of light reflected on a reflection surface of a reflecting mirror and pattern of light and shade occurring on a screen in a case where a glass substrate has irregularities on a surface thereof.

In a rear projection display according to the present invention, the above-mentioned reflecting mirror 3 is installed. As shown in FIG. 2, the rear projection display comprises the reflecting mirror 3, an optical unit 4, a screen 5 and so on. In such a device, the distance between the reflecting mirror 3 and the screen 5 is typically within a range of 20–70 cm.

The optical unit 4 comprises a high-brightness discharge lamp, three sheets of liquid crystal panel each of which corresponds to R (Red), G (Green) and B (Blue), a color filter and a projection lens being of a high caliber. Further, the screen 5 comprises a Fresnel lens, a lenticular to which a non-glare treatment is applied, and so on.

An explanation will be given of the function of the rear projection display according to the present invention which is constructed as mentioned above.

In the rear projection display, light (image) from the optical unit 4 is reflected on the reflecting mirror 3 and projected on the screen 5, thereby reproducing the image.

Even if a reflecting mirror 3, in which is used the glass substrate 1 formed by the float process, is installed as a mirror of the rear projection display, by forming the reflecting film 2 after the one surface 1a of the glass substrate 1 is polished, it is possible to prevent any light and shade pattern caused by a difference in light intensity caused by minute irregularities on the surface 1a of the glass substrate formed by the float process from occurring in the light image projected on the screen 5.

FIGS. 3A, 3B, 3C and 3D show the results of measurement of the irregularities on the surface of the glass substrate before and after polishing. A shows a graph of data of the measurement taken on an axis perpendicular to the transfer direction of the float process before polishing. B shows a graph of data of the measurement taken on an axis parallel to the transfer direction of the float process before polishing. On the other hand, C shows a graph of data of the measurement taken on an axis perpendicular to the transfer direction of the float process after polishing. D shows a graph of data of the measurement taken on an axis parallel to the transfer direction of the float process after polishing.

As shown in A and B, striped irregularities parallel to the transfer direction of the float process occur on the surface of the glass substrate. Further, C and D show that such irregularities can be reduced by polishing.

As the reflecting mirror 3, a back-surface-coated mirror can be used as well as the front-surface-coated mirror shown in FIG. 1. Also, the reflecting film can be formed of another material or materials to achieve a reflectance adequate to utilize an image reflected thereby, which is not limited to the aluminum reflecting mirror. Further, as the method for forming the reflecting film, another method can be used instead of the evaporation or sputtering film-forming method.

The reflecting mirror 3 according to the present invention can be applied to a rear projection display in which one sheet of liquid crystal panel is used by hologram color filter (film of diffraction grating) as well as a rear projection display which requires three sheets of liquid crystal panel each of which corresponds to R (Red), G (Green) and B (Blue).

As is fully explained in the above, according to the present invention, it is possible to reflect parallel light, which is incident on the reflecting mirror, at a reflection angle equal to the incident angle, and thereby the reflected light is prevented from going in different directions.

Further, according to the present invention, it is possible to sufficiently achieve image quality required in a case where the reflecting mirror is applied as a mirror of a rear projection display.

Further, according to the present invention, it is possible to sufficiently achieve image quality required in a case where the reflecting mirror is applied as a mirror of the rear projection display, even if the distance between the reflecting mirror and the screen is increased.

Further, according to the present invention, it is possible to improve the reflectance of the reflecting mirror.

Further, according to the present invention, it is possible to prevent any pattern of light and shade in an image projected on a screen which occurs due to the difference in light intensity, and thereby the image quality can be improved.

What is claimed is:

1. A reflecting mirror for use in a rear projection display, comprising:

a glass substrate having at least one polished surface which is polished to have a predetermined surface waviness, said predetermined surface waviness being 0.05 mm or less on the measurement condition that the cut-off value is 0.8 mm to 8 mm; and a reflecting film which is formed on said polished surface of said glass substrate.

2. A reflecting mirror as defined in claim 1, wherein said glass substrate is produced by a float process to have minute irregularities of 0.1 μm or less on the measurement condition that the cut-off value is 0.8 mm to 8 mm.

3. A reflecting mirror as defined in claim 1, wherein said reflecting film is obtained by film-forming in order of aluminum (Al), magnesium fluoride (MgF$_2$) and titanium dioxide (TiO$_2$).

4. A rear projection display, comprising:

a reflecting mirror as defined in claim 1;

an optical unit; and a screen.

* * * * *